Patented July 11, 1950

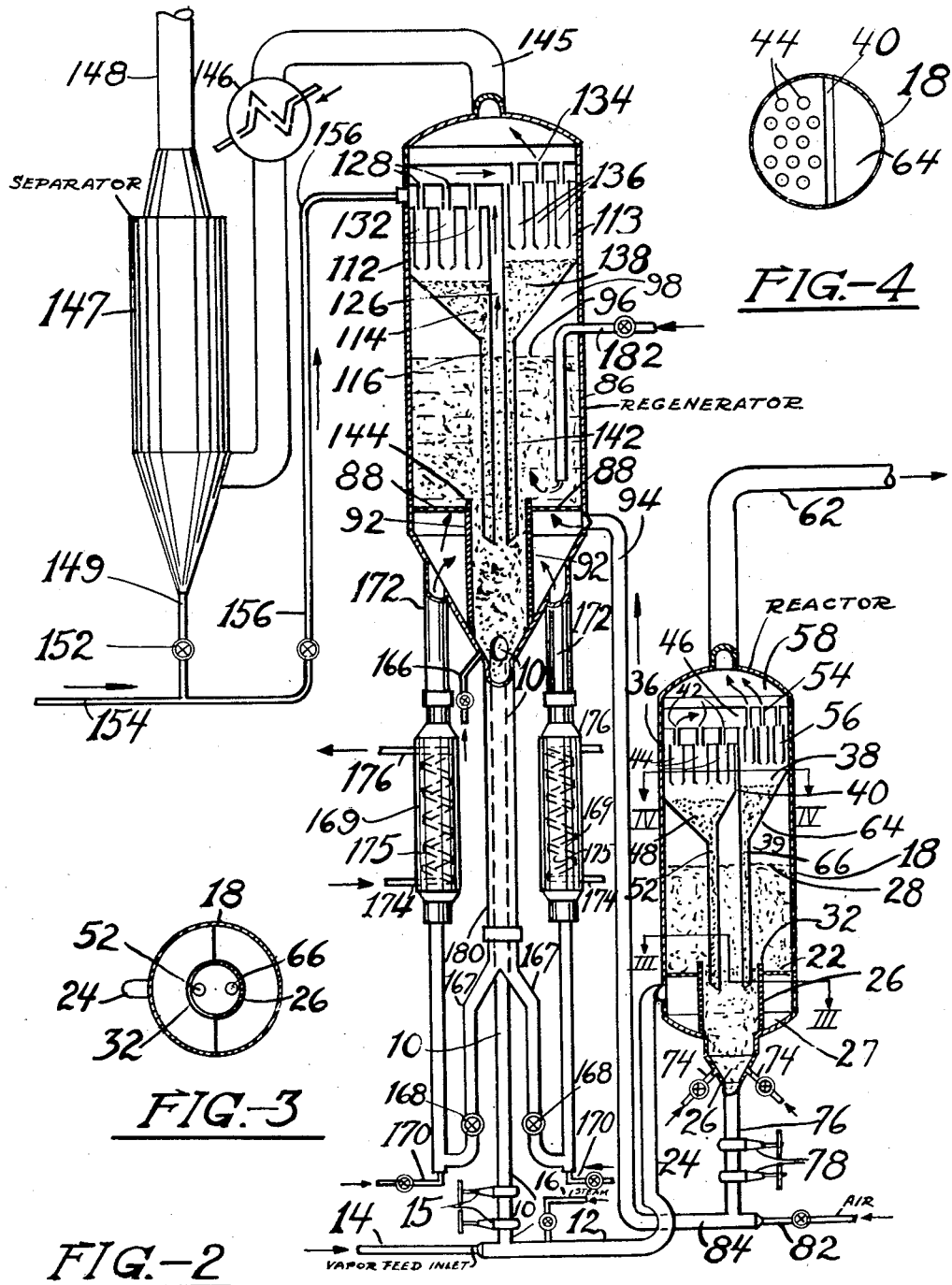

2,515,156

UNITED STATES PATENT OFFICE 2,515,156

FLUIDIZED CATALYST APPARATUS

Charles E. Jahnig, Roselle, and Homer Z. Martin, Elizabeth, N. J., assignors to Standard Oil Development Company, a corporation of Delaware Application July 24, 1941, Serial No. 403,830

7 Claims. (Cl. 23—288)

This invention relates to chemical reactions involving the use of powdered contacting materials and more particularly relates to catalytic conversions of hydrocarbons using powdered or finely divided catalyst.

According to the present invention, powdered catalysts or finely divided contacting material or catalyst is contacted with vapors or gases in a reaction vessel under suitable conditions of temperature, pressure and time of contact. The vapors or gases and powdered material are introduced into the reaction zone separately or the mixture as a suspension is introduced into the reaction zone or vessel. While the suspension remains in the reaction zone it is in a relatively dense fluidized state. The process is continuous.

During the reaction, especially in the catalytic conversion of hydrocarbons, the catalyst particles become coated with organic deposits and the catalyst particles are preferably removed from the reaction vessel and regenerated. The reaction zone is so arranged that the gases or vapors flow upward therein. The velocity of the vapors or gases in the reaction zone or vessel is so controlled that a dense bed of fluidized catalyst particles is maintained in the reaction vessel, that is, there is a definite level of the fluidized mixture in the reaction vessel and the fluidized mixture acts as a liquid. Most of the solid particles are withdrawn directly from the bottom of the reaction vessel in a dense phase in much the same manner as a liquid may be removed from the bottom of a containing vessel.

Some of the powdered catalyst or contacting material, however, does pass upwardly with the reaction products and this finely divided material is removed by separating means preferably positioned in the upper portion of the reaction vessel. The separated powdered material from the separating means is returned to the lower portion of the reaction vessel into a reservoir or well therein, whence it is withdrawn from the reaction vessel along with the aforementioned stream of fluidized solids taken from the reaction vessel. The vapors and powdered material above referred to may be introduced into the reaction vessel or zone around and exterior to the reservoir or well. In this way the vapors or gases and powdered contacting material pass upwardly in the reaction zone and the desired reaction is carried out before the catalyst particles are introduced into the reservoir or well. During the reaction the contacting material becomes spent or fouled.

The spent, partially spent or fouled contacting or catalytic material is withdrawn from the bottom of the reservoir or well as above described and is introduced into the bottom portion of a reaction or regeneration zone or vessel around and exterior to another reservoir or well therein. Regenerating gas is introduced into the regeneration zone.

The construction of the regeneration vessel is similar to the construction of the other reaction vessel except that provision is made for withdrawing some of the regenerated catalyst or finely divided material from the reservoir at the bottom of the regeneration vessel. This withdrawn portion of the catalytic or contacting material is cooled and returned to the bottom portion of the regeneration zone around and exterior to the reservoir to prevent the temperature from rising too high during regeneration. In the reactor, however, provision may also be made for adding heat to the oil vapors or solid particles by recycling withdrawn contacting particles in a similar manner.

Another portion of the regenerated catalytic or contacting material is withdrawn, mixed with additional reacting gases or vapors and the resulting suspension is passed to the reaction vessel. In the catalytic conversion of hydrocarbons the regenerated catalyst is used for converting additional quantities of hydrocarbons. In the regeneration vessel the velocity of the air or other regenerating gas is so controlled that the suspension of finely divided catalytic or contacting material in the gas is in a relatively dense fluidized condition and acts like a liquid, that is, there is a level of the fluidized mixture in the regeneration vessel similar to the level formed when a liquid is contained in a vessel.

The fluidized mixtures in the reaction vessels are in a turbulent condition and the solid contacting particles are intimately contacted with the gases or vapors and continuous mixing is obtained so the temperature in each reaction vessel is substantially uniform throughout its length.

While separating means have been provided in the upper portion of the regeneration and reaction vessels and some of the finely divided catalytic or contacting material is separated from gases and/or vapors passing upwardly above the level of the fluidized mixture in these vessels, most of the finely divided material remains as a relatively dense fluidized mixture in the reaction and regeneration vessels and the fluidized mixture is withdrawn from each of these vessels as a fluidized mixture in a dense phase so that there is a smaller burden on the separating means. With this invention fewer cyclones or other separating means are needed and lower cyclone pressure drops are obtained.

The regeneration vessel is constructed as a single unit and is supported intermediate its ends so that intermediate piping, expansion joints and steel work are reduced. The reactor or other reaction vessel is similarly constructed and supported.

This invention may be used where powdered catalytic or contacting material or agents are used and the process is operated continuously as the streams enter and leave the reactor and regenerator continuously.

One reaction vessel may be placed on a higher level than the other reaction vessel so that the two reaction vessels may be operated under different pressures.

In the drawing:

Figure 2 represents another form of apparatus for carrying out the invention;

Figure 3 represents a horizontal transverse cross section taken substantially on line III—III of Figure 2; and Figure 4 represents a horizontal transverse cross section taken substantially on line IV—IV of Figure 2.

Figure 1:
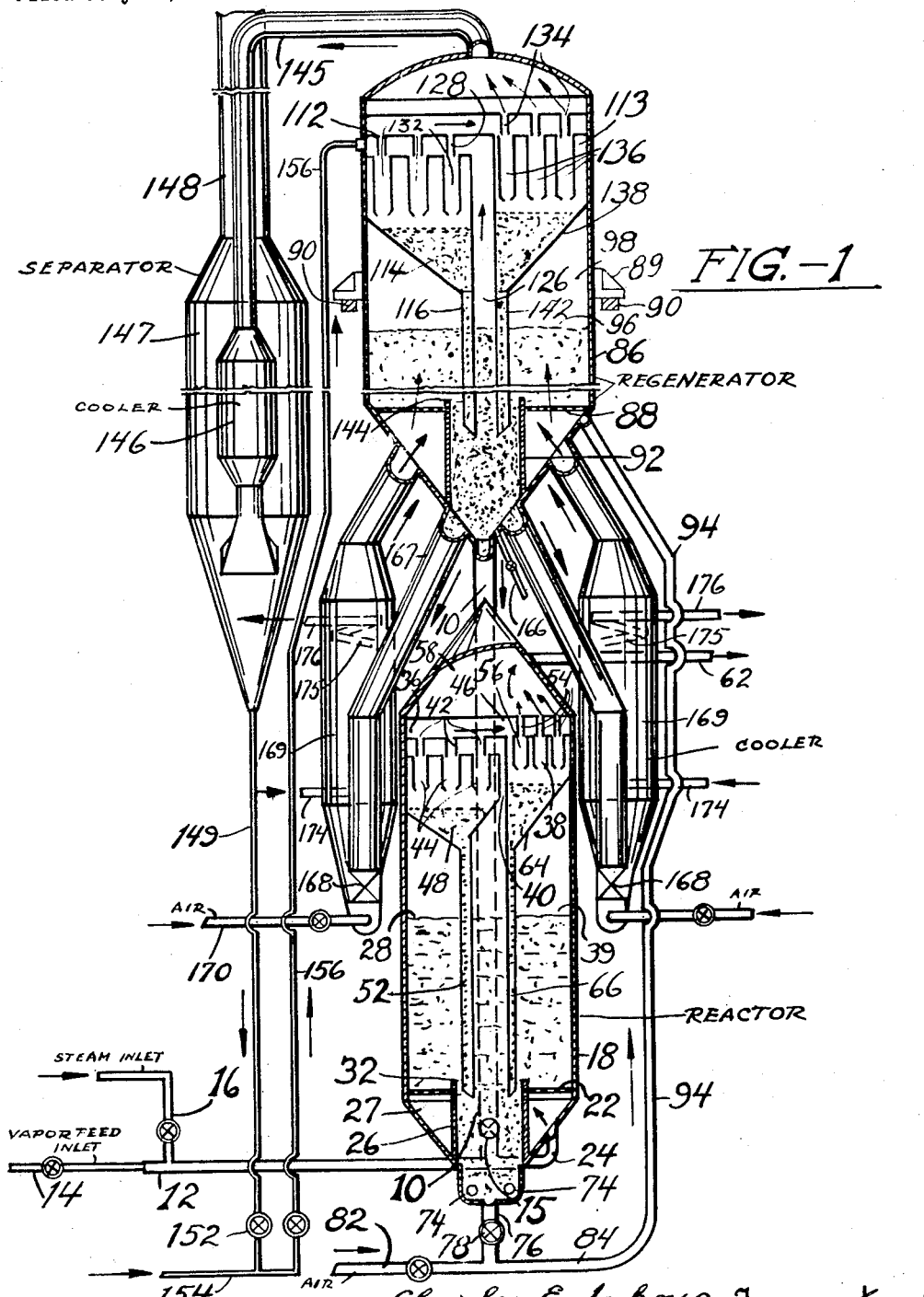
Figure 1 represents one form of apparatus which may be used for carrying out the invention.

Referring now to the drawing and more specifically to Figure 1, the reference character 10 designates a standpipe for delivering catalyst or solid contacting particles to a pipe 12 into which vapor or gas feed is introduced through line 14. The standpipe 10 has a control valve 15 at its lower end. The standpipe 10 will be hereinafter described in greater detail. Steam is preferably introduced into pipe 12 through line 16. The vapor or gas feed is introduced at such a rate to obtain a suspension of catalyst or solid contacting particles in the vapor or gas feed and this suspension is introduced into the lower portion of a vertically arranged reaction zone or vessel 18 below a horizontally arranged diffusion plate 22. Or, the solid particles and vapors or gases may be introduced into vessel 18 as separate streams below grid or diffusion plate 22. The solid particles may be introduced into the vessel 18 at other points, as for example, above the plate 22. The density of the catalyst vaporous suspension in the vertical pipe 24 leading to the reaction vessel 18, when using acid treated bentonite clay, may be about 0.05 to 2 pounds of powdered catalyst or contacting material per cubic foot of vapors or gases including vapor or gas feed and steam.

The density of the catalytic or contacting powdered material in the reaction zone or vessel 18, when the acid treated bentonite clay is used, is about 10 to 30 pounds per cubic foot. The velocity of the gases and vapors in vessel 18 may be about 0.5 to 3 feet per second, and under these conditions a relatively dense fluidized mixture is obtained in the vessel 18 which is in a turbulent condition and intimate contact between the vapor or gas feed and contacting particles is obtained.

If solid particles are used which have a higher density than the clay mentioned, the density of the fluidized mass in the vessel 18 for corresponding vapor velocities will be higher. If solid particles are used which have a lower density than the clay mentioned, the density of the fluidized mass in vessel 18 for corresponding velocities will be lower. This is also true for the regeneration zone to be described hereinafter.

The diffusion plate 22 surrounds the upper portion of a bottom reservoir or well 26 in the lower portion of the reaction vessel 18 and in the form of the invention shown in the drawing the suspension of contacting material and vapors is introduced into space 27 below plate 22 and exteriorly of the reservoir or well 26. The reservoir 26 is preferably cylindrical in cross section as shown in Figure 3 of the drawing. The vapors and the contacting material are mixed and the mixture remains in the reaction vessel at the desired temperature and for the desired time to effect the desired extent of reaction. The vapors or gases pass upwardly in vessel 18. While the catalyst or contacting particles are in the reaction vessel, they are maintained in a fluidized condition due to the velocity of the vapors in the vessel 18 so that the fluidized mass simulates liquid and has a level 28 within the reaction vessel.

The level 28 is generally not a quiescent level as shown in the drawing but is more like the upper surface of a violently boiling liquid, as vaporous reaction products are continuously leaving the surface of the fluidized mixture and these vaporous products carry with them overhead some of the finely divided contacting material. While the upper end 32 of the well 26 is shown as extending only a short distance above the diffusion plate 22, it is sufficiently high to prevent any substantial amount of short circuiting of the catalyst from the vessel 18 to well 26. It is to be understood that the upper part of the well 26 may be extended upwardly to a plane below the level 28, if desired. The upper end 32 of the well 26 as shown in the drawing preferably extends above the lower ends of dip pipes later to be described which return solid particles from the vaporous reaction products leaving vessel 18.

The fluidized mixture in the vessel 18 is relatively dense as above described and during the reaction some of the fluidized mixture flows into well 26. During the reaction, as for example in catalytic cracking of hydrocarbons, the catalyst particles become coated or impregnated with carbonaceous material which reduces the activity of the catalyst particles and it is necessary to regenerate them. The spent or partially spent catalyst or contact particles are withdrawn from the well 26 and sent to a regeneration vessel or the like hereinafter to be described in greater detail.

The catalyst is maintained as a fluidized mixture in the reaction vessel and most of the catalyst is withdrawn from the bottom of vessel 18 from well 26 as will be hereinafter described in greater detail. However, due to the violent agitation of the fluidized mixture, some of the catalyst particles or contacting material is carried upward with the vaporous reaction products and these particles are separated from the reaction products in separating means 36 and 38 arranged within the upper portion of the reaction vessel. These separating means are shown as cyclone separators but other forms of separators may be used. As most of the catalyst or contact particles are withdrawn from the bottom of the vessel 18, there is only a relatively small amount of particles passing overhead and fewer separating means are needed than in operations where the entire fluidized mixture is taken overhead.

The space 39 above level 28 in vessel 18 contains solid particles suspended in vapors or gases as a dilute phase and this suspension has a much lower density than the fluidized mass having the level 28. When using the acid treated bentonite clay particles, the dilute suspension in the space 39 may have a density of about 0.05 to 0.4 pound per cubic foot. With other solid particles having different densities, the density in the dilute phase will vary.

The vaporous reaction products and solid particles pass upwardly through space 40 between the two separating means 36 and 38 and into the first separating means 36. The vapors and solid particles pass around the small tubes 42 and solid particles are dropped into the larger tubes 44, the separated vapors passing overhead through passageway 46 and then to the second separating means 38 as will be presently described. The separated solid particles from tubes 44 drop into the hopper 48 associated with the first separating means 36 and from this hopper pass through a dip pipe 52 which extends below the level 28 of the fluidized mass of contacting material in the reaction vessel 18 and into the reservoir or well 26 so that the separated contacting particles are directly introduced into the well for removal from the reaction vessel.

The vapor products leaving the first separating means 36 are passed to the second separating means 38 and pass around small pipes 54, the solid particles being dropped through larger tubes 56 arranged below the smaller tubes 54. The separated vapors pass overhead to space 58 and leave the reaction vessel through line 62 to be further treated as for example in a fractionation system to separate desired motor fuels from other hydrocarbon fractions when the process is used for the catalytic conversion of hydrocarbons.

The solid particles separated in the second separating means 38 are dropped through tubes 56 in hopper 64 from which they are withdrawn through a dip pipe 66 which extends below the level 28 of the fluidized mass of catalytic or contacting material in the reaction vessel and into the well 26 from which they are withdrawn. It will be seen that the vaporous products leaving the fluidized mixture and containing entrained solids pass around dip pipes 52 and 66 to the space 40 between separating means 36 and 38. If desired a valve may be inserted into the lower end of each dip pipe 52 and 66. The lower ends of dip pipes 52 and 66 extend below the upper end 32 of well 26. In some cases the pipes 52 and 66 may terminate above the upper end 32 of well 26 so that the solid particles are returned to the body of solid particles in vessel 18.

The contacting particles after having passed through a conversion operation are covered or impregnated with carbonaceous or organic deposits and must be regenerated or reactivated to make them usable in another conversion operation. The spent or partially spent catalyst or contact particles collected in well 26 are withdrawn from the bottom thereof and conveyed to a regeneration system. The particles which collect in well 26 release the fluidizing gas and the mixture is more dense than the fluidized mixture in the vessel 18. Most of the spent or partially spent particles accumulating in well 26 are withdrawn from the fluidized mixture in vessel 18 and only a small part of the particles are introduced through dip pipes 52 and 66.

The spent or partially spent catalyst or contact particles in the well 26 are preferably purged by means of lines 74 which introduce steam or other suitable gas as a purging medium into the catalyst in the bottom portion of the well 26 for removing volatile hydrocarbons or other volatile materials from the solid contact particles before they are passed to the regeneration step. The purged catalytic or contact particles are withdrawn from the bottom of the well 26 through line 76 provided with a valve 78 for controlling the amount of solid particles withdrawn from the well 26.

When the process is used for the catalytic conversion of hydrocarbons, the carbonaceous deposits are preferably removed by burning. A regenerating agent or gas such as air is introduced into line 76 below the valve 78 through line 82 and the fouled catalyst and regenerating agent are passed through line 84 into a regeneration chamber or vessel 86 below a horizontally arranged grid plate 88 therein. The regeneration chamber or vessel 86 is similar to the reaction vessel previously described. Vessel 86 is provided with lugs 89 which rest on fixed supports 90 for supporting the vessel. The regeneration vessel is vertically arranged and is provided with a bottom well or reservoir 92 similar to the well or reservoir 26 described in connection with the reaction vessel 18.

The regeneration vessel 86 is arranged at a higher level than reaction vessel 18 as shown in the drawing so that the reaction vessel is maintained under a higher pressure. The reaction vessel 18 is at a higher pressure to get the reaction products through distilling equipment. The pressure generated by the fluidized catalyst or contact particles is used to provide pressure for transferring the spent or partially spent catalyst or contact particles to the regeneration vessel 86. The pressure in reaction vessel 18 is greater than in regeneration vessel 86 and this pressure plus the pressure provided by the head of catalyst or contact particles extending from level 28 to the valve 78 is sufficient to convey the lighter suspension through line 94 to the regeneration vessel 86. The air or regenerating agent introduced into line 84 through line 82 lowers the density of the solid gas suspension from line 76 and the suspension has a lower density than the mixture in vessel 18 and in this way the pressure in vessel 18 plus the pressure produced by the head of the fluidized mass therein is sufficient to force the particles to vessel 86.

Instead of having vessel 18 directly beneath regeneration vessel 86 as shown in Figure 1 of the drawing, the vessel 18 may be placed to one side as to the right or left of the regeneration vessel 86 but at substantially the same level as shown in the drawing. In Figure 2 of the drawing the vessel 18 is shown below and to the right of regeneration vessel 86.

The density of the contacting particles in the gas containing the regenerating agent may be about 0.1 to 4 pounds per cubic foot of the gas in the vertical inlet line 94 leading to the bottom portion of the regeneration vessel 86 when using acid treated bentonite clay particles. The density of the catalyst particles in the regeneration vessel 86 is about 10 to 30 pounds per cubic foot when using the acid treated bentonite clay particles and the velocity of the gas in vessel 86 is so maintained to obtain this density and to maintain the catalyst or contact particles as a relatively dense fluidized mass or mixture in the regeneration zone. The fluidized mass of finely divided material has a level indicated at 96 but here again the level is not that of a quiescent liquid but more like the surface of a violently boiling liquid as above described in connection with vessel 18.

The partially spent or fouled catalyst or contact material together with the air or other suitable regenerating agent is introduced into the regeneration zone and the mixture remains in the regeneration zone 86 for a sufficient time so that the desired amount of carbonaceous or organic material is burned from the particles and the particles are regenerated. The fouled or spent catalyst or contact particles are introduced into vessel 86 exteriorly of the reservoir or well 92. During regeneration it is necessary to prevent overheating of the solid catalyst or contact particles because the regeneration step is exothermic and if too high temperatures are permitted the activity of the catalyst is reduced and in some instances completely destroyed. According to this invention, cooled regenerated catalyst particles or contacting material is recycled to the regeneration vessel 86 as will be hereinafter described in greater detail.

During regeneration in vessel 86 the catalyst or contact particles are maintained in a turbulent condition and the particles and gases are completely mixed so that a substantially uniform temperature is maintained in vessel 86 during regeneration. The regenerated particles in the fluidized mixture pass directly into the well 92 from which they are withdrawn. In this process most of the regenerated particles are removed in a relatively dense fluidized condition from the well 92. However, some of the regenerated catalyst or contact particles are entrained with and suspended in the regeneration gases which leave the fluidized mass and pass overhead. The suspension of the particles in space 98 above level 96 in vessel 86 is a relatively dilute one and has a density of about 0.05 to 0.4 pound per cubic foot as described in connection with the space 39 above level 28 in vessel 18. It is desirable to recover these particles and the regeneration gases are therefore passed through the separating means 112 and 113 for separating solid particles from the regeneration gases. The separating means 112 and 113 are preferably located in the upper portion of the regeneration vessel 86.

In the first separating means 112 the solid finely divided particles are collected in a hopper 114 from which they are withdrawn by dip pipe 116 which extends below the level 96 of the fluidized mass of particles in the regeneration vessel 86 and into the well 92. More specifically, the regeneration gases and solid particles pass upwardly through passageway 126 between the separating means 112 and 113 and then around small tubes 128 from which the solid particles drop through enlarged tubes 132 into the hopper 114 and the separated gases pass to the second separating means 113.

In the second separating means the suspension of regenerated particles and regeneration gases pass around the small tubes 134, the solid separated particles passing down through enlarged tubes 136 into a hopper 138 associated with the second separating means 113. The separated gases pass upward through the small tubes 134 and pass overhead from the regeneration vessel 86 for further treatment which will be presently described. The solid particles separated in the second separating means 113 are withdrawn from the hopper 138 through a dip pipe 142 which extends below the level 96 of the fluidized mass of particles in the regeneration vessel 86 and into the well 92.

Preferably the dip pipes 116 and 142 associated with the separating means 112 and 113 extend below the upper end 144 of the well 92 in order to insure return of regenerated solid particles to the well 92. In some cases the dip pipes 116 and 142 may terminate above the upper end 144 of well 92 so that the pipes discharge the separated catalyst into the fluidized mass in vessel 86. While the upper end 144 of well 92 extends only a short distance above diffusion plate 88, it is sufficient to prevent any substantial amount of short circuiting of unregenerated catalyst from vessel 86 to well 92. If desired, the upper end 144 of well 92 may be extended upward to a higher level but below the level 96 of the fluidized mixture. If desired, a valve may be inserted into the lower end of each dip pipe 116 and 142.

The regeneration gases leaving the top of the regeneration vessel 86 still contain small amounts of fine particles and it is advisable to remove as large an amount as possible of solid particles from the gases and return them to the system. The separated regeneration gases leave the top of the regeneration vessel 86 through line 145 and are preferably passed through a cooler 146 to another separating means 147 which is preferably in the form of an electrical precipitator. The separated gases leave the top of the separating means 147 through line 148 and are vented to the atmosphere. The separated solid particles are withdrawn from the bottom of the separating means 147 through line 149 provided at its lower end with a valve 152 for controlling the level of solid particles in the hopper associated with separating means 147.

The separated fine particles are mixed with air or other suitable gas introduced through line 154 and the suspension is passed through line 156 to the first separating means 112 arranged in the regeneration vessel 86 for separating the solid particles from the suspending gas.

The separating means 112 and 113 are shown in the drawing as multiclone separators but other separating means may be used. It is further to be noted that the separting means 112 and 113 are arranged within the regeneration vessel 86.

The catalyst particles or contacting material collected in the well 92 comprises regenerated particles which may be used again in another catalytic conversion or other reaction. The standpipe 10 above referred to communicates with the bottom of the well 92 for withdrawing regenerated particles from the well 92. Preferably the particles in the standpipe 10 are maintained in a fluidized condition so that they will flow like a liquid and in order to assure that the particles will be maintained in this condition, steam or other suitable gas is introduced along the standpipe 10 at spaced intervals through suitable lines not shown. Any number of branch lines may be used. In addition a line 166 which communicates with a suitable manifold is provided for the bottom of the well or reservoir 92 for introducing fluidizing gas into the bottom of the well. Steam may be introduced into well 92 through line 166 for purging the regenerated catalyst in well 92.

The catalyst or contact particles in a relatively dense mixture in regeneration vessel 86 below level 96 forms part of the standpipe 10 so that the pressure developed at the bottom of the standpipe 10 is equivalent to a fluidized column of solid particles extending from the bottom of the standpipe 10 to the level 96 of the body of the catalyst in regeneration vessel 86. By using a part of the regeneration zone as the standpipe, the height of the standpipe is reduced.

The regeneration vessel 86 is shown at a higher level than reactor 18 and therefore the reactor 18 operates under a higher pressure. However, the pressure developed by standpipe 10 as above described is sufficiently high to introduce regenerated solid particles into reactor 18 through line 24.

With the arrangement shown in the drawings the regeneration vessel 86 may be substantially at atmospheric pressure and the reactor 18 may be at a pressure of about 8 pounds per square inch. These pressures are by way of example only and our invention is not to be restricted thereto. By having the reactor 18 under a slight pressure, the reaction products are carried to suitable equipment for further treatment as a fractionation system, etc. Where it is desired to have the regeneraton vessel at a higher pressure than atmospheric pressure, the pressure in reactor 18 will be correspondingly increased.

As the reactor 18 is at a higher pressure than the regeneration vessel 86 only a short standpipe 76 is required to return the spent catalyst to the regeneration zone.

If desired, the vessels 18 and 86 may be arranged at the same level or the arrangement shown in the drawings may be reversed in some instances.

The withdrawal of the regenerated catalyst particles or contacting material from the well 92 in the regeneration vessel and the cooling means for the regeneration vessel will now be described.

In order to control the temperature during regeneration, portions of the regenerated particles are withdrawn from the well 92 and passed through a cooler or coolers and then returned to the bottom portion of the regeneration zone 86. Any number of coolers may be used. One of these cooling systems will be described and it will be understood that the other cooling systems are similar in construction and operation. A portion of the regenerated particles is withdrawn from the bottom of well 92 through line 167 having a valve 168 at its lower end for controlling the amount of particles to be passed through the cooler 169. Suspending gas such as air or steam is introduced into the bottom portion of line 167 through line 170 and the suspension is passed through the cooler 169 in an upward direction. The mixture in line 167 is denser than in cooler 169 because air has been introduced through line 170 and because of this difference in density the flow is down in line 167 and up in cooler 169. The cooled particles are then returned to the bottom portion of the regeneration vessel below the grid member 88 and exterior to the well 92 so that the cooled particles are mixed with the particles to be regenerated and in this way the temperature is prevented from rising to an undesirable degree.

By removing the regenerated catalyst through line 167 as a dense phase it is used as such and returned to the regeneration zone without need of intermediate separation and redispersion as when taking the suspension overhead from the regenerator. If desired, the cooler 169 may be placed in line 167 to cool the fluidized mixture in the dense phase.

The cooling means is introduced into the cooler through line 174, passes through a coil or other heat exchange device 175 in the cooler 169 and leaves the cooler through line 176. Any cooling means may be used for passage through the coolers 169 and the heat may be recovered in any desired manner. In one form of the invention in the catalytic conversion of hydrocarbons the liquid feed oil is passed in parallel through the coolers 169 for preheating the oil feed while at the same time abstracting heat from the regenerated particles. If desired, the oil feed may be passed through the coolers in series but under these conditions the individual coolers will be at different temperatures and different amounts of expansion will be obtained for the different coolers.

In Figure 1 of the drawing it will be seen that the coolers 169 are so arranged to permit a closer arrangement of reactor 18 and regeneration vessel 86 and a more compact construction is provided. The upper portion of reactor 18 fits between the coolers 169.

Fresh catalyst or contacting material is preferably introduced into the regeneration chamber 86 through a suitable line which extends below surface 96 in the regenerator 86 to replace catalyst or contacting material lost during the operation of the process or removed to maintain activity.

In Figure 2 the reactor 18 is shown below and to the right of regeneration vessel 86. Like reference numerals are used to designate the same parts in Figures 1 and 2. It is to be noted that two valves 15 are used at the bottom of standpipe 10 in Figure 2 and that two valves 78 are used in standpipe 76 in Figure 2. One of the valves in each instance may be manually controlled and the other valve may be automatically controlled in any desired manner to control the rate of flow of catalyst from the standpipes and to maintain a level of catalyst in the respective hoppers.

In Figure 2 it will be seen that the upper part of standpipe 10 communicates with one portion of the well 92 and another standpipe 180 communicates with the bottom of well 92 in the regenerator 86. The standpipe 180 branches into lines 167 for delivery of hot regenerated catalyst to the coolers 169 above described in connection with Figure 1. In this form of the invention the coolers 169 may be placed in lines 167 if desired.

Fresh catalyst or make-up catalyst is preferably added to the regeneration vessel 86 in Figure 2 by means of line 182 which extends below the surface 96 of the catalyst in vessel 86.

In order to maintain a level of dense phase catalyst or contact material in the reaction vessels 18 and 86 and remove catalyst as a dense phase from the bottom of the vessels, it is essential that the rate of feed of solid particles to the vessel be greater than the rate at which catalyst is carried out by means of vapors or gases passing overhead. For instance, it has been found that when operating the reaction vessels at a velocity of about 1.0 foot per second of the outgoing gases or vapors passing through passageway 40 in reactor 18, the amount of solid particles carried overhead is about 5 pounds per 100 cubic feet of gas so that the solid particles must be fed in at a greater rate than this to maintain a level in the vessels.

The amount of catalyst or solid particles carried overhead from the reaction vessels varies with the distance between the level of the dense fluidized mass and the gas outlet (40 in reactor 18), the amount of solid particles going overhead decreasing as the distance is increased. For example, in reactor 18 as the level 28 is lowered and the distance from outlet 40 to level 28 increases, the amount of solid particles going overhead with the gases or vapors and passing through passageway 40 is decreased.

It is important to maintain a level of fluidized particles in the vessels 18 and 86. Valve 78 is used to maintain the level 28 in reactor 18 at a desired height. The level 28 can be lowered by opening valve 78 to a greater extent so that the rate of removal of catalyst or other particles from the reactor 18 through standpipe 76 is greater than the rate at which the solid particles are added to the reactor through line 24. To raise the level 28 valve 78 is moved toward closed position so that the solid particles flow into the reactor 18 faster than they are removed from the reactor and hence the level builds up. The valve 78 may be automatically controlled in any suitable manner to maintain the level 28 at any desired height. Other ways of controlling the level 28 may be used.

If desired, the level 28 may be held at different heights to produce different results. For example in the catalytic conversion of hydrocarbons the extent of conversion may be controlled by the amount of catalyst in the reactor 18 and the amount of catalyst in the reactor will be independent of slight variations in the rate of catalyst feed or oil feed. Where a high degree of cracking is desired, level 28 in reactor 18 will be held at a high level and the hydrocarbon vapors or gases in passing through the reactor 18 will be contacted with a large amount of catalyst. Where a smaller amount of conversion is desired, the level 28 will be maintained at a lower level and the vapors or gases will be contacted with a smaller amount of catalyst. The extent of reaction in other cases may be similarly controlled by varying the level of the contact particles in the reactor. The extent of regeneration of the solid particles in regeneration vessel 86 may also be regulated by varying the level 96 of the solid particles therein.

In the catalytic cracking of hydrocarbons to produce lower boiling hydrocarbons suitable for use as motor fuel, catalysts such as acid treated bentonites, synthetic gels containing silica and alumina or other suitable catalysts may be used. The size of the catalyst particles is preferably about 200 to 400 mesh or finer and the reaction temperature may be 700° F. to 1000° F. When using acid treated bentonites as the cracking catalyst, the regeneration temperature is preferably maintained below about 1200° F. and sufficient catalyst particles are recirculated through the coolers 169 to prevent higher temperatures. With more rugged catalysts higher regeneration temperatures may be permitted.

Our invention may also be used where solid material in finely divided or powdered form is contacted with gases or vapors in a treating or reaction zone to bring about physical or chemical changes in the gases or solids or both. For example, our invention may be used for separation and purification of gases by solid adsorbents and recovery of gasoline from natural gas, casinghead gas, cracked refinery gas or the like.

Our invention may also be used in various organic reactions in which the finely divided solid acts as a catalyst, as oxidation, reduction, chlorination, hydration, dehydration etc., and more particularly various hydrocarbon reactions where- in solid catalysts or treating agents may be used such as cracking, hydrogenation, dehydrogenation, treating polymerization, alkylation, dealkylation, isomerization, aromatization, desulfurization, reforming, hydroforming, synthesis of hydrocarbons from carbon monoxide and hydrogen, and the like.

While two forms of apparatus has been shown for carrying out the invention and certain examples of catalysts and conditions have been given, it is to be understood that these are by way of illustration and various changes and modifications may be made without departing from the spirit of the invention.

We claim:

1. Apparatus of the character described including elongated vessels arranged one above the other, means for introducing gases or vapors and solid particles into each of said vessels, means for supporting said upper vessel, heat exchangers suspended from said upper vessel below said supporting means and communicating with said upper vessel, said heat exchangers being arranged and spaced to embrace the top portion of said lower vessel whereby a compact structure is provided, means for withdrawing solid particles from the bottom portion of each of said vessels, means for withdrawing gases or vapors from the upper portion of each of said vessels and means for passing the solid particles withdrawn from said upper vessel to said lower vessel.

2. An apparatus of the character described including an elongated vertically arranged cylindrical vessel, means for introducing a suspension of solid particles in a gaseous medium into the lower portion of said vessel and passing the suspension upwardly in said vessel, a separate cylindrical reservoir in and concentric with said vessel and extending into the lower portion thereof, means for supporting said vessel, said reservoir having a bottom outlet and serving to remove some of the solid particles from said vessel, a heat exchanger below said reaction vessel, means for removing at least a portion of the solid particles from said reservoir and passing them through said heat exchanger and then returning them to the lower portion of said vessel, said heat exchanger being connected to and supported by the lower portion of said vessel below said supporting means.

3. An apparatus of the character described including in combination a reaction vessel, heat exchangers suspended from the bottom portion of said reaction vessel, a second reaction vessel below said first reaction vessel and having its upper end portion arranged between said heat exchangers whereby a compact construction is obtained, said reaction vessels being adapted to contain solid particles in fluidized condition, a pipe connecting the bottom portion of said first vessel with said second vessel for flowing solid particles from said first vessel to said second vessel and means whereby fluidized particles from said first vessel are circulated through said heat exchangers and returned to said first vessel.

4. In apparatus for effecting catalytic conversion with solid catalyst of small particle size, a cylindrical reactor, means extending through a wall of said reactor for introducing a suspension of powdered catalyst in a gaseous stream into the reactor, means for distributing said introduced stream at a low level in said reactor whereby a uniform dense turbulent suspended catalyst phase may be maintained above said distributing means in the reactor by the upflowing gaseous stream, means at the top of said reactor for separating solid particles from gases and for returning separated catalyst particles to the reactor, means for withdrawing gases from which solids have been separated, a bottom section of the reactor below the distributor means which is of smaller cross-sectional area than the reactor above the distributor means, means for introducing an aerating gas at a low point in said bottom section, a standpipe with its upper end communicating with said bottom section, means for maintaining catalyst in said standpipe in an aerated condition, and a conduit for a second gas stream communicating with the base of said standpipe whereby catalyst may be suspended from the base of said standpipe into said second gaseous stream.

5. An apparatus of the character described according to claim 4 in which the means for separating solid particles from gases includes at least one cyclone separator provided with a dip pipe for returning separated catalyst particles to said reactor.

6. In apparatus for effecting catalytic conversion with solid catalyst of small particle size, a cylindrical reactor, means extending through a wall of said reactor for introducing a suspension of powdered catalyst in a gaseous stream into the reactor, means for distributing said introduced stream at a low level in said reactor whereby a uniform dense turbulent suspended catalyst phase may be maintained above said distributing means in the reactor by the upflowing gaseous stream, means at the top of said reactor for separating solid particles from gases and for returning separated catalyst particles to the reactor, means for withdrawing gases from which solids have been separated, a reservoir extending above and below said distributor means and into the lower portion only of said reactor, said reservoir being of smaller cross sectional area than said reactor above the distributor means and adapted to receive the catalyst particles from the lower portion of said reactor, means for introducing an aerating gas at a low point in said reservoir, a standpipe with its upper end communicating with the lower portion of said reservoir, means for maintaining catalyst in said standpipe in an aerated condition, and a conduit for a second gas stream communicating with the base of said standpipe whereby catalyst may be suspended from the base of said standpipe into said second gaseous stream.

7. An apparatus of the character described in claim 6 wherein said means for separating solid particles from gases includes at least one cyclone separator provided with a dip pipe for returning separated catalyst particles to said reactor.

CHARLES E. JAHNIG.
HOMER Z. MARTIN.

REFERENCES CITED

The following references are of record in the file of this patent:

UNITED STATES PATENTS

| Number | Name | Date |
| --- | --- | --- |
| 1,461,174 | Bennett | July 10, 1923 |
| 1,539,482 | Hawley | May 26, 1925 |
| 1,799,858 | Miller | Apr. 7, 1931 |
| 1,845,058 | Pier | Feb. 16, 1932 |
| 1,984,380 | Odell | Dec. 18, 1934 |
| 2,016,641 | Lincoln | Oct. 8, 1935 |
| 2,231,424 | Huppke | Feb. 11, 1941 |
| 2,264,438 | Gaylor | Dec. 2, 1941 |
| 2,320,343 | Bailey | June 1, 1943 |
| 2,357,901 | Lewis et al. | Sept. 12, 1944 |
| 2,451,803 | Campbell et al. | Oct. 19, 1948 |

FOREIGN PATENTS

| Number | Country | Date |
| --- | --- | --- |
| 533,037 | Germany | Sept. 8, 1931 |